3,652,498
PROCESS FOR PREPARING POLYAMIDE-IMIDES
Edwin F. Morello, Whiting, Ind., and Carl Serres, Jr., Naperville, Ill., assignors to Standard Oil Company, Chicago, Ill.
No Drawing. Continuation-in-part of application Ser. No. 26,429, Apr. 7, 1970. This application Mar. 1, 1971, Ser. No. 119,875
Int. Cl. C08g 20/32
U.S. Cl. 260—47 CP     12 Claims

ABSTRACT OF THE DISCLOSURE

An improved process for producing soluble polymers for use as a polyamide-imide wire enamel. In a process where wire enamels are produced from an equimolar reaction of an acid halide of a benzene tricarboxylic acid anhydride and an aromatic primary diamine in an alkyl substituted phenol or phenol medium, the improvement in said process comprising pretreating the reaction medium with about 1 to 5% water or aliphatic alcohol based on weight prior to the scavenging of the entrained hydrogen halide with an alkylene oxide consisting of about 2 to 4 carbon atoms thus reducing the tendency of the polymer solution to gel and improving the properties of said polymer.

---

This is a continuation-in-part application of Ser. No. 26,429 filed Apr. 7, 1970 and now abandoned by the same inventors.

This invention relates to a novel process for preparing aromatic polytrimellitamide-imide polymers and their use for producing insulation on wire and other surfaces and more particularly to the improved process for preparing wire enamels using water or an aliphatic alcohol in alkyl substituted phenols or phenol prior to the addition of the alkylene oxide hydrogen halide scavengers.

The polymers may be described as polyamides having some polyimide linkages; said polyamides are capable, when heated, of conversion to the polyamide-imide form. Such polyamides are high molecular weight polymeric compounds having in their molecules units of

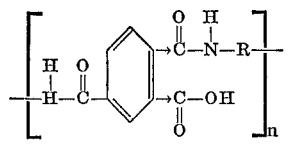

wherein→denotes isomerism and wherein R is a divalent aromatic organic radical. This organic radical consists of R' divalent aromatic hydrocarbon radicals joined by stable linkages —O—, —CH$_2$—,

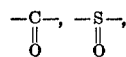

—SO$_2$— and —S—, as are in the groups —R'—O—R'—, —R'—CH$_2$—R'—,

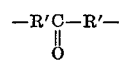

—R'—SO$_2$—R'—,

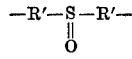

and —R'—S—R'—. The molecular weight of these polyamides is sufficiently high to prodlce upon heating a film-forming polymer. Said amides are susceptible to condensation by heating to a polyamide-imide having to a substantial extent recurring units of

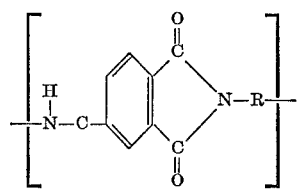

wherein R is a divalent aromatic organic radical in which in addition to hydrogen, nitrogen, sulfur and oxygen atoms can be attached to the carbon atoms. This organic radical consists of R', which is a divalent aromatic hydrocarbon radical o rtwo R' divalent aromatic hydrocarbon radicals joined by stable linkages —O—, —CH$_2$—,

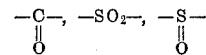

and —S—, as are in the groups —R'—O—R', —R'—CH$_2$—R'—

The prior art polytrimellitamide polymers have been prepared in organic solvents containing nitrogen. When phenol or alkyl substituted phenols such as ortho, meta or para-cresols, xylenols, either singly or as mixtures thereof have been used, there has been a problem in eliminating the hydrogen halide which is a reaction by-product of the acid halide of a benzene tricarboxylic acid anhydride and an aromatic primary diamine. It has been found that the hydrogen chloride evolved by the reaction of the acid halide of benzene tricarboxylic acid anhydride with a primary diamine cannot be readily removed in gaseous form. Various vacuum techniques have been applied as shown in U.S. Pat. 3,494,890. In U.S. Pat. 3,347,-828 it is shown that alkylene oxide can be used to remove the hydrogen halide. When using phenol or alkyl substituted phenols, such as ortho, meta or para-cresol, known as cresylic acid, this processing is not possible since an interaction of the acid halide of the benzene tricarboxylic acid anhydride with this cresylic acid occurs, necessitating in the use of much higher temperature, but if this is done, polymer degradation occurs in the process. Additionally if the entire stoichiometric amount of scavenger is post-added, gellation occurs.

It has been discovered that when the reaction of the acid halide of benzene tricarboxylic acid anhydride with the aromatic primary diamine is carried out at a temperature of about 10 to 50° C. and then water, or a monofunctional or polyfunctional aliphatic alcohol is added in about 1 to 5% by weight of reactants, solvents and alkylene oxide and is allowed to digest for a few hours and only then is the reaction mixture treated with alkylene oxide containing about 2 to 4 carbon atoms in a straight chain the gellation tendencies of the polymer solution are substantially reduced consequently improving the properties of the polymer. Without this addition of water or the monofunctional or polyfunctional aliphatic alcohol gellation occurs within a short period of time which renders the polymer solution useless. The monofunctional or polyfunctional aliphatic alcohols found particularly useful include glycerol, isopropyl alcohol, 2-octyl alcohol, ethylene glycol, polypropylene glyco and tertiary-Amyl alcohol.

According to the process of this invention an acyl derivative of the benzene tricarboxylic acid anhydride and an aromatic diamine are reacted in the presence of phenol, or alkyl substituted phenols such as ortho, meta or para-cresol, serving as a solvent for the reaction to produce the polyamide-imide. The temperature of the reaction is about 10 to about 70° C., preferably about 20 to about 50° C. After the polymer has formed, water or an aliphatic alcohol is added usually about 1–5% by weight and is allowed to digest for a few hours. The alkylene oxide is added, using from about zero to 10% excess. The amount of alkylene oxide added is calculated from the acid titer value. The polymers as formed have an amide content which varies from 55 to 100% and the imide content is from 0 to 45 percent. The polyamide-imide after heat curing theoretically contain 50 percent amide linkages and 50 percent imide linkages.

The first type of the polymers produced may be defined as those soluble in organic solvents and capable of further reaction upon application of heat. They may be employed in solution, in high solids suspensions, or as powders in the production of coatings, laminates, films, fibers, molded products and as impregnating varnishes. The second type of polymers—the polyamide-imides—are much less soluble than the amides and when they have been heat cured they are generally insoluble in organic solvents and may be regarded as cured end-product in the way of coatings, laminates, films, enamel-wire coatings and the like. The latter are characterized by resistance to solvents, by high thermal stability and good electrical characteristics.

According to the process of this invention, the polyamide products are prepared by reacting acyl halide derivatives of trimellitic anhydride(1,2,4 - benzene tricarboxylic acid anhydride) with an aromatic primary diamine in the presence of aromatic carbocyclic alcohols as solvents. The preferred primary aromatic diamines are p,p'-methylenebis (aniline), p,p'-oxybis(aniline) and p,p'-amino phenylsulfone. The preferred solvents are phenol, o-, p-, m-cresols, xylenols, either singly or as mixtures thereof commonly known as cresylic acids. The usual solvent identified as cresylic acid 9PX contains about 48–55% phenol, 15–33% ortho-, meta- and para-cresol and 9–19% xylenols and about 5% other C9 substituted phenols may be diluted up to 30% with aromatic hydrocarbons. The preferred hydrocarbons are xylene, toluene and commercial aromatic hydrocarbon fractions.

The aromatic polytrimellitamide solution suitable for producing a wire coating at elevated temperatures comprises about 12 to about 30 weight percent of said polytrimellitamide and a phenol or alkyl substituted phenol as a solvent. The phenol or alkyl substituted phenols may be diluted up to 30% with the aromatic hydrocarbons named above. The liquid film of the resulting solution is heated at a temperature of about 200–600° F. to produce a smooth continuous coating. These wire coatings are useful in the electrical industry.

The acyl halide derivatives are reacted in the phenol or alkyl substituted phenols solvent with an aromatic having one or more aromatic rings and two primary amino groups. These aromatic diamines have the formula

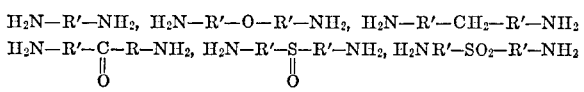

and $H_2N-R'-S'R'-NH_2$ wherein R' is a divalent aromatic hydrocarbon radical hereinbefore indicated. The aromatic content of the diamine provides the thermal properties in the polymer while the primary amino groups permit the desired imide rings and the amide linkages to be formed in the polymer. Generally the aromatic diamine has from one to about four aromatic rings, advantageously from one to about two aromatic rings. The aromatic diamines having more than one aromatic ring may be further characterized as polycyclic aromatic compounds having two primary aromatic rings which may be interconnected by condensation, as in naphthalene or phenanthrene type structures, or may be bridged, either directly as in diphenyl diamines, or indirectly as, for example, two R' groups joined with unreactive stable inert linkages such as oxy, alkyl, carbonyl, sulfonyl, and other relatively inactive groups such as sulfide group, as hereinbefore described. The alkyl group may be illustrated by methylene, ethylene, substituted derivatives such as dimethylmethylene, and the like. Suitable nuclei, the R' divalent aromatic hydrocarbon radical, include phenylene, naphthylene, anthrylene, naphthacenylene and the like; diphenylene, terephenylene, phenylnaphthalene, quarterphenylene and the like; and aromatic rings separated by oxy, alkyl, carbonyl, sulfonyl and thio groups.

Advantageously, the linkages between the aromatic groups are oxy, or methylene, and the amino groups are in the meta or para position in the aromatic nucleus. The polyamide polymers have molecular weights above about 5,000/and the polyamide-imide polymers have molecular weight in excess of about 9,000. The defined polyamide of the first reaction as described hereinabove is soluble in organic solvents. Using the aromatic carbocyclic alcohols as solvents, solutions containing about 12 to about 30 percent solids by weight are obtainable. For applications requiring use of solutions for producing wire coatings, impregnating varnishes and the like, solutions of about 15 to about 25 weight percent and advantageously about 18 percent are desired. Such concentrations provide solutions with a good balance between solids content and solution viscosity for ease of handling in most practical applications. The viscosities for such solutions are in the range of about 3 to about 150 poises. For example, the viscosity of phenol-cresol solutions having about 17 percent solids is about 30 poises at a temperature of 25° C.

By way of a particular example, 1.48 moles of the 4-acid chloride of trimellitic anhydride is added to a solution of 1.48 moles of p,p'-methylenebis(aniline) in 2,040 cc. of cresylic acid in a solvent containing ortho, meta or para-cresol. The addition is carried out over a period of about one to two hours at a temperature of 20–50° C. After the addition is complete the reaction is maintained at a temperature of about 30 to 50° C.

After the addition heat is applied for about two hours to maintain this temperature. Fifty-three (53) grams of water is then added and the solution is digested for about two hours. The solution has a greenish haze and it is cooled to ambient temperature usually room temperature and then about ninety (90) grams of propylene oxide is slowly added. Stirring is continued and viscosity increases over several hours to a Brookfield level of 9.5 poises at 23.3° C. This polymer solution has shown no instability for a period of greater than one year. These solutions were diluted with cresol to about an 18% polymer level, guanidine carbonate bonding agent was added and wire coatings on copper wire were prepared. Films were also cast on glass panels and cured to 500° F. to 600° F. On stripping from the glass panels strong flexible films were obtained. Tensile values around 12,000 p.s.i. were obtained for these films on an Instron tester with an elongation of 5–6%.

These coating solutions are useful in electrical insulation, particularly in insolated conductors generally referred to as magnet wire. Magnet wire carries the currents that generate magnetic and electrical fields in transformers, motors, generators, solenoids magnets and related apparatus.

It will be understood that the following examples are for illustrative purposes only and do not purport to be wholly definitive with respect to the scope of the invention.

EXAMPLE I

In a nitrogen atmosphere 1.48 moles of the acid chloride of trimellitic anhydride (4–TMAC) is added to a 1.48 mole solution of methylene-bis-aniline in 2040 cc. (2150 g.) of cresylic acid solvent (9PX). Two hours is required for addition and cooling is needed to maintain the temperature at 50° C. After addition is complete, heat is applied as needed and reaction temperature maintained at 50° C. for an additional 2 hours. Fifty-three grams of water is then added and the solution digested at 50° C. for three hours. The solution has a greenish haze at this point. The reaction mixture is cooled to ambient temperature and ninety grams (3.5% excess) of propylene oxide is slowly added. Stirring is continued and viscosity increases over several hours to a Brookfield level of 9.5 poises at 23.3° C. The polymer solution has been monitored for 1½ years to date and has shown no instability. An identical reaction was run without the water addition step and gellation occurred in several hours.

Solutions for wire coating were prepared by diluting to a 17–18% polymer level and adding machine carbonate bonding agent to insure adhesion to copper wire. Copper wire coated on a vertical coating oven at a 750° F. cure temperature passed a 320 second burn-out test. To be amenable to automatic winding and normal abuse the wire should take a full snap. This means it should be capable of being drawn rapidly to break and have the stretched portions of the coating on the wire remain integral, i.e., it should have no cracks (brittleness) or "tube" which means poor adhesion, or the coating essentially separating from the substrate. In other words, the stretched portion must be dielectric. In addition the SNAP it is desirable that the stretched portion of the snapped wire be wound about a mandrel as small as possible. The mandrels are 1, 2, 3, etc. times the wire diameter and are named 1×, 2×, 3×, etc. Hence, a rating terminology for flexural properties is Snap-Smallest Passing Mandrel or SSPM. A SSPM of 1 is the top rating. More realistically on a commercially acceptable scale SSPM of 2 is very good, 3 is good, 4 is acceptable and 5 is poor. Our sample passed a 1× mandrel at 20% SNAP and a full SNAP test on a 2× mandrel. Thus our sample scored very good (2) on the Snap-Smallest Passing Mandrel test. Polymer coated over a polyester base coat passed similar flexibility tests and had a 360 second burn-out value.

EXAMPLE II

In a nitrogen atmosphere 1.48 moles of the acid chloride of trimellitic anhydride is added to a 1.48 mole solution of methylene-bis-aniline in 2040 cc. (2150 g.) of cresylic acid solvent. Two hours is required for addition and cooling is used to maintain the temperature at 50° C. After addition is complete, heat is applied and reaction temperature maintained at 50° C. for an additional one hour. Fifty-three grams of water is then added and the solution digested at 50° C. for 1⅓ hours. The reaction mixture is cooled to room temperature and 83.3 grams of propylene oxide is slowly added. Stirring is continued and viscosity increases over several hours to a Brookfield level of 17 poises at 25° C. The polymer solution has been monitored for 1½ years to date and has shown no instability. The polymer solution when coated on a wire exhibited properties similar to the ones given for Example 1.

EXAMPLE III

In a nitrogen atmosphere 1.48 moles of the acid chloride of trimellitic anhydride is added to 1.48 mole solution of methylene-bis-aniline in 2040 cc. (2150 g.) of cresylic acid solvent. Two hours is required for addition and cooling is used to maintain the temperature at 50° C. After addition is complete, heat is applied and reaction temperature maintained at 50° C. for an additional two hours. Fifty-three grams of water is then added and the solution digested at 50° C. for three hours. The reaction mixture is cooled to room temperature and 89 grams of propylene oxide is slowly added. Stirring is continued and viscosity increases over several hours to a Brookfield level of 13.6 poises at 24° C. The polymer solution has been monitored for six months to date and has shown no instability. The polymer solution when coated on a wire exhibited properties similar to the ones given for Example 1.

EXAMPLE IV

In a manner identical to Example No. 1 polymerization was conducted in cresylic acid solvent containing 150 g. of N-methylpyrrolidone (1.48 moles) as a condensing agent. The digestion step with water was reduced slightly to 1 hour and 50 minutes and a 5% excess of propylene oxide (135.5 g.) used to neutralize hydrogen chloride. Over several hours viscosity increased and reached a value of 16.2 poises at 25° C. This solution was stable for 2 months before gellation occurred. Before gellation occurred wires coated with this polymer solution exhibited good physical properties.

EXAMPLE V

A solution of 5.84 pounds (13.4 moles) of methylene-bis-aniline and 3⅓ pounds of caprolactam (13.4 moles) was prepared in 38 pounds of cresylic acid solvent. A Pfaudler type stirred kettle was used with a nitrogen purge. An equivalent amount (6.2 pounds) of the 4-acid chloride of trimellitic anhydride is added in portions over 2½ hours and temperature maintained at 40–50° C. Cooling is necessary initially. After addition is complete, stirring is continued at 50° C. for 2 hours to insure complete reaction. Two percent water (485 g.) is added and stirring continued an additional 2 hours. The reaction mixture is then cooled to ambient and 1.79 pounds (14.0 moles—4.5% excess) of propylene oxide added slowly over 1 hour. Stirring was continued and solution viscosity gradually increased to 28.6 poises at 25° C. Monitored solutions became hazy at 2 months and sets to a gel soon after. Before gellation occurred wires coated with this polymer solution exhibited good physical properties.

EXAMPLE VI

In a nitrogen atmosphere (358.1 gm.) 1.7 moles of 4-TMAC is added to a solution of methylene-bis-aniline (MBA) (1.7 moles) in 1250 cc. of cresylic acid solvent (9PX). Two hours is required for addition and cooling is used to maintain the temperature at 50° C. After addition is complete, heat is applied and reaction temperature maintained at 45–50° C. for an addition 2 hours. t-Amyl alcohol (61.2 gm.) is then added and the solution digested at 50° C. for 1 hour. The reaction mixture becomes very thick and 320 cc. of cresylic acid (9PX) is added and temperature is increased to 60° C. for 2 hours. The reaction mixture containing some suspended solid is cooled to ambient, and 103.5 gm. of propylene oxide is slowly added. Temperature is kept below 30° C. Stirring is continued and viscosity increases over several hours to a Brookfield level of 30 poises at 23.4° C. A clear homogeneous solution results.

Solutions for wire coating were prepared by dilution to a 17–18% polymer level and adding guanidine carbonate bonding agent (0.5% on solids) to insure adhesion to copper. Wire coating data is shown in Table II. Thermal properties, indicated by burnout values, are slightly higher for the AI-overcoat system (AI-over polyester) and coatability is improved.

EXAMPLE VII

In a manner identical to Example No. 1, polymerization was carried out using 358.1 gm. of 4-TMAC, 337.3 gm. of MBA and 1672.5 gm. of cresylic acid (9PX) solvent. This is an adjusted solids level of 25 percent to reduce intermediate reaction viscosity. Reaction conditions were identical to Example VI, until the "alcohol digestion" period was reached. t-Amyl alcohol (63.2 gm.) was added. Temperature was maintained at 50° C. for 2 hours, and 103.5 gm. of propylene oxide was slowly added. Temperature is kept below 30° C. Stirring is continued and viscosity increases over several hours. With these milder reaction conditions, Brookfield viscosity reached 280 poises at 24.1° C. after 24 hours, and continued to increase. This polymer solution was unstable and could not be wire coated. After 13 days, it was found that polymer solutions had set to a gel.

EXAMPLES VIII–XII

Examples VIII–XII referred to in Table I were carried out in a manner identical to Example No. VI to the point of alcohol addition. The reaction mixture was then heated to 60° C., and two percent on total weight of the corresponding alcohol was then added. Reaction temperature was maintained at 60° C. for 3 hours, and the homogeneous solution was then cooled to ambient temperature for propylene oxide addition. The reaction mixture was then allowed to stir overnight to reach the maximum viscosity levels shown in Table I.

These polymer solutions had a 20% solids level and were used directly for wire coating tests without further dilution. Guanidine carbonate bonding additive was added as in Example No. VI.

The coatings in Table II were subjected to the snap test, burn-out test and the dielectric strength was measured. These tests are described below:

(1) Burn-out: This test is used to simulate the extreme current overloads (overheating) which can occur in small horsepower motors during stall conditions. This short-term thermal stability is determined by exposing the insulation to extreme temperatures up to 400–500° C. through resistance heating to a point where two adjacent wires of a twisted wire pair short out by carbonization of the enamel. A current of 36 amps is applied to the twisted wire pair and held for 180 sec. The current is then increased two amps and held for another 180 sec., this process being repeated until the enamel shorts out. The temperature of the wire is proportional to the applied current.

(2) Dielectric strength: This test is an indication of the film's ability to withstand the electrical stresses found in motor and transformer windings and its ability to function as an insulator. Values of this property represent the specific resistance of the insulation to a continuously increasing voltage.

(3) Snap: This test is a measure of the adhesion of the enamel to the conductor. The wire is rapidly elongated until breaking, about 20% elongation for a 18 AWG copper wire. Cracks in the enamel denote failure.

TABLE I.—ALCOHOL STABILIZATION TESTS

| Example | Alcohol used | Reaction conditions, hrs.[1] | | | Percent alcohol | Final[2] viscosity, poises | Comments |
|---|---|---|---|---|---|---|---|
| | | TMAC Add'n | Hold | Water digestion | | | |
| VIII | Glycerol | 2.5 | 2.0 | 3.0 at 60° C | 2.0 | 12.6 at 24.7° C | |
| IX | Isopropyl alcohol | 2.5 | 2.0 | 3.0 at 60° C | 2.0 | 9.2 at 25.1° C | |
| X | 2-octyl alcohol | 2.5 | 2.0 | 3.0 at 60° C | 2.0 | 9.9 at 25.0° C | |
| XI | Ethylene glycol | 2.5 | 2.0 | 3.0 at 60° C | 2.0 | 8.5 at 25.0° C | |
| XII | Polypropylene glycol | 2.5 | 2.0 | 3.0 at 60° C | 2.0 | 18.4 at 24.8° C | |
| VI | Tert-amyl alcohol | 2.5 | 2.0 | {1.0 at 50° C, 2.0 at 60° C} | 2.0 | 30.3 at 23.4° C.[3] | Stable solution. |
| VII | do | 2.5 | 2.0 | 2.0 at 50° C | 2.0 | 280 at 24.1° C.[4] | Solution gelled in 2 weeks. |

[1] 4-TMAC addition and hold periods were at 50° C.
[2] Viscosity at 20% solids.
[3] 23.5% solids.
[4] 25% solids.

TABLE II

| Example | Enamel No. | Percent solids | Visc., poises | Speed, f.p.m. | Cure temp., °F. | Bottom temp., °F. | Build, mil. | 20% jerk +SPM | Burn-out sec. | Dielectric strength, kv. p.m. |
|---|---|---|---|---|---|---|---|---|---|---|
| VI A | Solecoat | 22.6 | 26.9 | 30 | 750 | 500 | 1.9 | 5X | 215 | 2.41 |
| VI B | Solecoat | 22.6 | 26.9 | 30 | 750 | 550 | | Fail | 205 | 2.00 |
| VI C | Solecoat | 22.6 | 26.9 | 25 | 750 | 550 | | | 478 | 2.37 |
| VI A | Over Isonel 200 basecoat | 22.2 | 10.5 | 50 | 700 | 500 | 3.1 | 1X | 427 | 3.55 |
| VI B | Over Isonel 200 basecoat | 22.2 | 10.5 | 50 | 750 | 500 | | 1X | 360 | 3.95 |
| VI C | Over Isonel 200 basecoat | 22.2 | 10.5 | 50 | 800 | 500 | 3.0 | 2X | 507 | 3.94 |
| VI D | Over Isonel 200 basecoat | 22.2 | 10.5 | 60 | 800 | 500 | 3.0 | 1X | 394 | 3.62 |

We claim:

1. In a process for producing a soluble polymer for use as a polyamide-imide wire enamel from an acid halide of a benzene tricarboxylic acid anhydride and an aromatic primary diamine wherein the aromatic radical consists essentially of divalent mono- and poly-aromatic hydrocarbons containing 1 to 4 aromatic rings wherein said multiple rings are joined directly or by members selected from the group consisting of oxy, sulfonyl, sulfur, carbonyl and lower alkylene groups, in which hydrogen halide is produced, essentially equimolar amounts of said tricarboxylic acid halide and diamine being reacted in phenol or a mixture of phenol and alkyl substituted phenols, the improvement in said process comprising treating the reaction mixture with about 1 to 5 percent by weight of water or an aliphatic alcohol prior to the scavenging of the entrained hydrogen halide with an alkylene oxide containing 2 to 4 carbon atoms in a straight chain and capable of forming a halohydrin boiling below about 300° C. thus reducing the tendencies of said reaction mixture to gel.

2. Process of claim 1 wherein the acid halide is selected from the group consisting of acid chloride and acid bromide.

3. The process of claim 1 wherein the acid halide is the acid chloride of trimellitic anhydride.

4. The process of claim 1 wherein said alkylene oxide is propylene oxide.

5. The process of claim 1 wherein said diamine is p,p'-methylenebis(aniline).

6. The process of claim 1 wherein said diamine is p,p'-oxybis(aniline).

7. The process of claim 1 wherein the alcohol is polypropylene glycol.

8. The process of claim 1 wherein the aliphatic alcohol is glycerol.

9. The process of claim 1 wherein the aliphatic alcohol is isopropyl alcohol.

10. The process of claim 1 wherein the aliphatic alcohol is 2-octyl alcohol.

11. The process of claim 1 wherein the aliphatic alcohol is ethylene glycol.

12. In a process for producing a soluble polymer for use as a polyamide-imide wire enamel from the 4-acid chloride of trimellitic anhydride and p,p'-methylenebis(aniline) in which hydrogen halide is produced, essentially equimolar amounts of the 4-acid chloride of trimellitic anhydride and p,p'-methylenebis(aniline), being reacted in phenol or a mixture of phenol and alkyl substituted phenols, the improvement in said process comprising treating the reaction mixture with about one to five percent by weight of water or an aliphatic alcohol prior to the scavenging of the entrained hydrogen chloride with propylene oxide thus reducing the tendencies of said reaction mixture to gel.

References Cited

UNITED STATES PATENTS

| | | | |
|---|---|---|---|
| 3,260,291 | 7/1966 | Lavin et al. | 260—30.2 |
| 3,347,828 | 10/1967 | Stephens et al. | 260—47 |
| 3,494,890 | 2/1970 | Morello | 260—47 |

WILLIAM H. SHORT, Primary Examiner

L. L. LEE, Assistant Examiner

U.S. Cl. X.R.

260—78 TF

UNITED STATES PATENT OFFICE
CERTIFICATE OF CORRECTION

Patent No. 3,652,498     Dated March 28, 1972

Inventor(s) Edwin F. Morello and Carl Serres, Jr.

It is certified that error appears in the above-identified patent and that said Letters Patent are hereby corrected as shown below:

Col. 1, line 71  "prodlce" should be "produce"

Col. 2, line 19  "o rtwo" should be "or two"

Col. 3, line 45  "substituted phenols may be diluted up to 30% with aromatic hydrocarbons" should be "substituted phenols. The phenol or alkyl substituted phenols may be diluted up to 30% with aromatic hydrocarbons."

Col. 3, line 61  after "aromatic" insert "diamine"

Col. 4, line 24  "5,000/" remove the /

Col. 5, line 22  "machine" should be "guanidine".

Col. 5, line 33  "the" should be "to".

Signed and sealed this 7th day of November 1972.

(SEAL)
Attest:

EDWARD M. FLETCHER, JR.
Attesting Officer

ROBERT GOTTSCHALK
Commissioner of Patents